United States Patent [19]

Nakagawa et al.

[11] 4,224,205
[45] Sep. 23, 1980

[54] POLYVINYL ALCOHOL OPTICAL BRIGHTENING COMPOSITION

[75] Inventors: Yunosuke Nakagawa, Saitama; Kozo Fujii, Funabashi, both of Japan

[73] Assignee: Kao Soap Company, Tokyo, Japan

[21] Appl. No.: 933,028

[22] Filed: Aug. 11, 1978

[30] Foreign Application Priority Data

Aug. 15, 1977 [JP] Japan .................................. 52-97660

[51] Int. Cl.$^3$ ............................................. C08L 29/04
[52] U.S. Cl. ............................................... 260/29.6 B
[58] Field of Search ................... 206/213; 252/301.21, 252/301.34; 260/29.6 B; 8/1 W

[56] References Cited

U.S. PATENT DOCUMENTS

| | | | |
|---|---|---|---|
| 2,663,989 | 12/1953 | Schlatter et al. | 106/213 |
| 3,066,036 | 11/1962 | Curtin et al. | 106/213 |
| 3,419,405 | 12/1968 | Lang | 106/211 |
| 3,547,854 | 12/1970 | Roth et al. | 260/29.6 R |
| 3,708,466 | 1/1973 | Kappler et al. | 260/17.4 ST |
| 4,008,172 | 2/1977 | Von Rütte | 252/301.34 |
| 4,023,978 | 5/1977 | Messina | 106/213 |
| 4,087,240 | 5/1978 | Reinert et al. | 252/301.34 |

FOREIGN PATENT DOCUMENTS 429517  5/1967  Japan .

OTHER PUBLICATIONS

Society of Cosmetic Chem., vol. 5, 249 (1955).

*Primary Examiner*—Theodore Morris
*Attorney, Agent, or Firm*—Birch, Stewart, Kolasch & Birch

[57] ABSTRACT

A uniform transparent aqueous liquid composition is disclosed. The solid components of the composition consist essentially of; (A) a nonionic surfactant having one or more polyoxyethylene radicals in the molecule as a hydrophilic group, (B) a nonionic water soluble polymer having hydroxyl radicals or pyrrolidone radicals in the molecule, and (C) as a fluorescent optical brightener, a 4,4'-bis(2-sulfostyryl)biphenyl salt. The composition is especially effective on clothes made of hydrophobic fibers, such as polyester fibers.

9 Claims, No Drawings

POLYVINYL ALCOHOL OPTICAL BRIGHTENING COMPOSITION

BACKGROUND OF THE INVENTION

1. Field of the Invention

The present invention relates to a liquid starch composition, especially to a uniform transparent aqueous liquid starch composition. The solid components of the composition consist essentially of three specifically combined components, that is, a nonionic surfactant having one or more polyoxyethylene radicals in the molecule as a hydrophilic group, a nonionic water soluble polymer having hydroxyl radicals or pyrollidone radicals, and a fluorescent optical brightener which is a 4,4'-bis(2-sulfostyryl)biphenyl salt.

2. Description of the Prior Art

It is well known that the whiteness of clothes made of hydrophilic fibers, such as cotton, which has changed to a yellowish or grayish color while being used, can be recovered by washing, bleaching or treating with fluorescent optical brighteners available at home. On the other hand, the recovery of whiteness of clothes made of hydrophobic fibers, such as polyester fibers, is generally difficult, and almost impossible by means available at home.

Starch compositions used by housewives for finishing clothes are categorized into aerosol spray starch compositions or aqueous liquid starch compositions. The aerosol spray starch composition consists of a gaseous propellant phase, a liquified propellant phase and an aqueous phase to be sprayed. Such compositions are disclosed in U.S. Pat. No. 3,547,854 to W. Ruth et al. and in U.S. Pat. No. 4,023,978 to R. P. Messina.

The main component of the aqueous liquid starch composition is a water soluble or dispersible polymer, such as alpha-starch, modified starch, polyvinyl alcohol or polyvinyl acetate. Many kinds of additives to improve the composition are known. For example, in Japan Patent Publication No. 1967-9517, a propylene oxide and ethylene oxide adduct of a higher aliphatic alcohol is added to an aqueous starch composition for the purpose of improving lubricity on ironing. In U.S. Pat. No. 3,066,036 to Cortin et. al., a liquid starch composition comprising an oxidized starch, a polyethylene glycol ester of a fatty acid, boric acid and borax is disclosed. In U.S. Pat. No. 3,419,405 to Lang, a starch composition comprising a pre-gelatinized starch and a laundry souring agent, stability of which is improved by adding an anionic or nonionic surfactant, is disclosed. In U.S. Pat. No. 3,708,466 to Kappler, an aqueous size composition comprising (1) an unmodified starch, (2) polyvinyl acetate emulsion, (3) an anionic or nonionic surfactant and (4) laundry sour is disclosed.

It is also known that some commercial liquid starch compositions for clothes contain fluorescent optical brighteners and as their main component a water soluble or dispersible polymer. Such starch compositions not only make clothes rigid but also contribute to the whiteness recovery of clothes. A triazinylaminostilbene type fluorescent optical brightener is one of the most conventional types used in liquid starch compositions.

An aqueous dispersion of a fluorescent optical brightener, stabilized by adding (a) a water soluble salt and (b) a nonionic water soluble polymer or a nonionic surfactant is disclosed in Japan Patent Publication (laid open for public inspection) No. 1976-111238. In this publication, a sufficient amount of the water soluble salt contained in the dispersion to inhibit the dissolution of the fluorescent optical brightener.

SUMMARY OF THE INVENTION

According to the present invention, a uniform transparent aqueous liquid starch composition containing a fluorescent optical brightener is obtained.

The composition consists essentially of:

[I] 3 to 25 percent by weight of a mixture of,
 (a) a nonionic surfactant of HLB 10 to 13 having one or more polyoxyethylene radicals in the molecule as a hydrophilic group,
 (b) a nonionic water soluble polymer having hydroxyl radicals or pyrollidone radicals in the molecule,
 the weight ratio of (a) the nonionic surfactant to (b) the nonionic water soluble polymer being 9/1 to 1/9,

[II] 0.3 to 5 percent by weight of a 4,4'-bis(2-sulfostyryl)biphenyl salt represented by the formula,

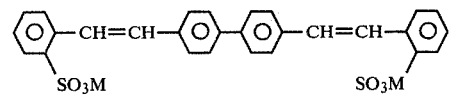

wherein M is sodium, potassium, monoethanol amine or diethanol amine

[III] the balance of water to make the total 100 percent by weight.

DESCRIPTION OF THE PREFERRED EMBODIMENTS

The solid components of the liquid aqueous starch compositions of the present invention consist of three specifically combined components, i.e., a nonionic surfactant, a nonionic water soluble polymer and a fluorescent optical brightener.

Any kind of nonionic surfactant having one or more polyoxyethylene radicals in the molecule as a hydrophilic group and an HLB of about 10 to about 13 may be used in accordance with the present invention.

Typical examples of these nonionic surfactants are:

(1) Polyoxyethylene alkyl ethers represented by the following formula:

wherein $R_1$ is a linear or branched, primary or secondary alkyl radical having a carbon number of 8 to 22, and m is an integer of 3 to 8.

(2) Polyoxyethylene alkylphenyl ethers represented by the following formula:

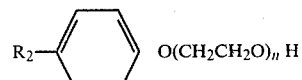

wherein $R_2$ is a linear or branched alkyl radical having a carbon number of 8 to 22, and n is an integer of 5 to 17.

(3) Polyoxyethylene aliphatic acid esters represented by the following formula:

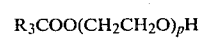

wherein $R_3$ is a linear or branched alkyl radical having a carbon number of 7 to 21, and p is an integer of 3 to 13.

(4) Polyoxyethylene sorbitan aliphatic acid mono-, di-, or triesters. The average mol number of the added ethylene oxide in the ester is 2 to 20, and the carbon number of the aliphatic acid is 8 to 20.

Preferred examples of these nonionic surfactants are polyoxyethylene alkyl ethers having alkyl radicals of 8 to 20 carbon atoms.

Not only one species of the nonionic surfactant but also a mixture thereof may be used.

According to the present invention, the HLB (Hydrophilic-Lipophilic Balance) of these nonionic surfactants having one or more polyoxyethylene radicals in the molecule as a hydrophilic group is important, and an HLB of about 10 to about 13 is usable in the present composition. An HLB value lower than about 10 results in a sticky cloth touch and an HLB higher than about 13 results in a stiff cloth touch when starch compositions containing nonionic surfactants having these HLB values are applied on clothes. Best results are obtained by using the nonionic surfactant having an HLB of about 12.

The HLB of these nonionic surfactants can be easily determined. Determination of HLB is well-known in the art, for example, note W. C. Griffin, *Journal of Soc. Cosm. Chemists*, vol. 1, 311(1951), and W. C. Griffin, ibid., vol. 5, 249(1955). According to Griffin, the HLB of polyoxyethylene alkyl ethers and polyoxyethylene alkylphenyl ethers may be calculated with the following formula;

$$HLB = E/5$$

wherein E represents the weight percentage of the oxyethylene content, and the HLB of polyoxyethylene aliphatic acid esters and polyoxyethylene sorbitan aliphatic acid esters may be calculated with the following formula;

$$HLB = 20(1 - S/A)$$

wherein S represents the saponification number of the ester and A represents the acid number of the aliphatic acid.

Any kind of nonionic water soluble polymer having hydroxyl radicals or pyrollidone radicals in the molecule may be employed in accordance with the present invention.

Typical examples of these nonionic water soluble polymers are:

(1) Polyvinyl alcohols having a saponification degree of at least 15, preferably 50 to 100 mol percent. The polyvinyl alcohols are prepared by saponifying polyvinyl acetate partially or completely.

(2) Copolymers of vinyl alcohol and maleic anhydride having at least 15 mol percent of hydroxyl radicals.

(3) Copolymers of vinyl alcohol and acrylic acid, an ester thereof with a lower alcohol having a carbon number of 1 to 4, methacrylic acid or an ester thereof with a lower alcohol having a carbon number of 1 to 4, said copolymers having at least 15 mol percent of hydroxyl radicals.

(4) Polyvinyl pyrrolidones.

(5) Copolymers of vinyl pyrrolidone and vinyl acetate having at least 15 mol percent of pyrrolidone radicals.

(6) Copolymers of vinyl pyrrolidone and maleic anhydride having at least 15 mol percent of pyrrolidone radicals.

(7) Copolymers of vinyl pyrrolidone and acrylic acid, an ester thereof with a lower alcohol having 1 to 4 carbon atoms, methacrylic acid or an ester thereof with a lower alcohol having 1 to 4 carbon atoms, said copolymers having at least 15 mol percent of pyrrolidone radicals.

The viscosity of these nonionic water soluble polymers in water is important in accordance with the present invention; a viscosity of 10 to 1000 cps in 10 weight percent aqueous solution at room temperature, i.e. about 25° C., is acceptable.

These nonionic water soluble polymers may be used alone or in a mixture thereof in the composition.

Preferred examples of these nonionic water soluble polymers are those which have at least 15 mol percent of hydroxyl radicals in the molecule described above. More preferred ones are polyvinyl alcohols having saponification degrees of 50 to 100 mol percent.

The 4,4'-bis(2-sulfostyryl)biphenyl salt which is used as a fluorescent optical brightener in accordance with the present invention is represented by the following formula:

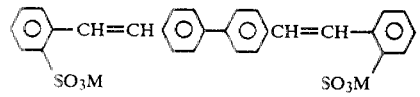

wherein M is an alkali metal such as sodium and potassium or an alkanol amine, such as monoethanol amine and diethanol amine.

Alternatively the compound is referred to as 4,4'-distyryl biphenyl-2,2-disulfonate. A preferred salt of the 4,4'-bis(2-sulfostyryl)biphenyl is the sodium salt.

The total amount of the nonionic surfactant and the nonionic water soluble polymer in the composition of the present invention is 3 to 25 percent by weight, preferably 5 to 17 percent by the weight based on the whole composition. Weight ratio of the nonionic surfactant to the nonionic water soluble polymer is 9/1 to 1/9, preferably ½ to ⅕. A total amount of the nonionic surfactant and the nonionic water soluble polymer of more than 25 percent by weight results in inconvenient handling and instability of the composition. Weight ratios of the nonionic surfactant to the nonionic water soluble polymer outside the range of 9/1 to 1/9 cause an unduly sticky or stiff cloth touch of clothes as compared to a desired moderate touch.

The amount of the 4,4'-bis(2-sulfostyryl)biphenyl salt in the composition may be 0.3 to 5 percent by weight, preferably 0.5 to 2 percent by weight based on the whole composition. Amounts less than about 0.3 percent by weight result in ineffective whitening, and amounts more than about 5 percent by weight also result in ineffective whitening.

The best results seem to be obtained when the three components essential to the present invention are combined as follows:

About 1.8, i.e. from 1.5 to 2.0, weight percent of polyoxyethylene alkyl ether having a linear primary alkyl radical of carbon number 10 to 18 and HLB of about 12; about 13, i.e. from 10 to 15, weight percent of polyvinyl alcohol having a saponification degree of about 80 mole percent and a viscosity of about 60 cps in 10 weight percent aqueous solution at room temperature; about 0.9, i.e. from 0.7 to 1.2, weight percent of disodium 4,4'-bis(2-sulfostyryl)biphenyl; and the balance of water to make the total 100 percent of weight.

The balance of the composition is essentially water. Water may be substituted partially by suitable solubilizers, such as methanol and ethanol.

Other minor components which are useful as additives for the starch composition, such as preservatives, fungicides, anticorrosives, and antifoaming agents, may be contained in the composition.

The liquid starch composition is conveniently diluted with from 2 to 100 times, more conveniently from about 4 to 50 times by weight of water before the clothes are dipped in the diluted solution. Then the clothes are dried by suitable methods, for example air drying, with a dryer or/and with an iron, if desired. The liquid starch composition of the present invention may be applied to clothes made of any kind of fibers, although the composition is effective to clothes made of hydrophobic fibers, especially of polyester fibers.

In accordance with the present invention, a uniform transparent liquid starch composition is obtained by specifically combining; (a) the nonionic surfactant, (b) the nonionic water soluble polymer, and (c) the fluorescent optical brightener, 4,4'-bis(2-sulfostyryl)biphenyl. The advantages of the present invention may be summarized as follows:

(1) Moderate rigidity of clothes is obtained when the clothes are treated with the composition.

(2) Clothes do not feel sticky or stiff but agreeable when clothes are treated with the composition.

(3) The composition is stable while it is stored at warehouses or on shelves at stores. In other words, no gelation or precipitation occurs but a uniform transparent phase is maintained during the storage.

(4) Sufficient amounts of the fluorescent optical brightener adhere uniformly to clothes, especially even those made of hydrophobic fibers, such as polyester fibers, when clothes are treated with the composition.

Combinations of (a) the nonionic surfactant and (c) the fluorescent optical brightener cause a stiff cloth touch. Unexpected advantages of the present invention including an agreeable cloth touch moderate rigidity, high stability, and uniform and sufficient amount of adhesion of the fluorescent optical brightener, are obtained by combining these three components.

In order to be understood more readily, the following examples are set forth primarily for the purpose of illustration. All parts in the examples are based on weight. A number in a parenthesis just after the word "polyoxyethylene" in the examples means the average mole number of added ethylene oxide per molecule. The viscosity of nonionic water soluble polymers is measured in 10 percent by weight aqueous solution at 25° C.

Performances of the liquid starch compositions are tested as follows:

*Rigidity (Cantilever Method, according to Japan Industry Standard No. 1005-1959)
  Polyester test cloth pieces having a length of 15 cm and a width of 2.5 cm are dipped in diluted liquid starch compositions, then air-dried. a thus treated test piece is placed on a smooth surface of a horizontal plate, adjusting the shorter side of the test piece at the base line of a scale on the plate. The horizontal plate has a slope at an angle 45 degrees at one side. The test piece is slid on the surface toward the slope by being pushed from the rear side of the test piece. When the front side of the test piece reaches the slope, the position of the rear side of the test piece is measured on the scale, and the value measured is recorded. The larger the value is, the more rigid is the test piece.

*Degree of Fluorescent Strength Increase
  Fluorescent strength of a polyester test cloth both before the treatment with a diluted test starch composition and thereafter is measured with a color difference meter. The degree of fluorescent strength increase is defined by the difference between the strength before the treatment and after the treatment.

*Cloth Touch
  A polyester test cloth is treated with a diluted test starch composition and touched with naked hands and the cloth touch is determined by a sensuous appraisal compared with a standard cloth which has been treated with a starch composition solution containing 0.3 weight percent of polyvinyl acetate.

*Adhesion Condition of the Fluorescent Optical Brightener
  Test cloth pieces are treated with a diluted test starch composition. Unformity of the fluorescence is observed with the naked eye while ultraviolet rays are radiated on the test cloth pieces.
  Marks:
    O: uniformly fluorescent
    Δ: strongly but unevenly fluorescent
    X: nonuniformly fluorescent

*Stability of the Starch Composition
  Test starch compositions in 100 cc sample bottles are allowed to stand at room temperature for two weeks. Their condition in the bottles is observed with the naked eye.

EXAMPLE 1

75 parts of polyvinyl alcohol (saponification degree of about 80 mole percent, viscosity of 60 cps) are dissolved in 375 parts of water while being stirred. 10 parts of polyoxyethylene (6.3) lauryl ether (HLB of 12.1) are added to the solution. 5 Parts of disodium 4,4'-bis(2-sulfostyryl)biphenyl are dispersed in 95 parts of water. A uniform transparent liquid starch composition is obtained by blending the aqueous dispersion with the aqueous solution. The starch composition has the following formulation:

| | |
|---|---|
| Polyoxyethylene (6.3) lauryl ether (HLB 12.1) | 1.8% by weight |
| Polyvinyl alcohol (saponification degree of about 80 mole percent, viscosity of 60 cps) | 13.4% by weight |
| Disodium 4,4'-bis(2-sulfostyryl)- biphenyl | 0.9% by weight |
| Water | Balance |

Test results with the product of Example 1 are shown in Table 2.

EXAMPLES 2-8

By the same procedure of Example 1, liquid starch compositions having the following formulations are prepared:

| | |
|---|---|
| Nonionic Surfactant (shown in Table 1) | 1.8% by weight |
| Polyvinyl alcohol (saponification degree of about 80 mole percent, viscosity of 60 cps) | 13.4% by weight |
| Disodium 4,4'-bis(2-sulfostyryl)-biphenyl | 0.9% by weight |
| Water | Balance |

The liquid starch compositions are diluted with 24 times their weight of water. Test pieces of polyester cloth are dipped in the thus diluted liquid starch compositions, air-dried, and the performance of the starch compositions are tested using the treated polyester cloth pieces.

Results are shown in Table 1.

TABLE 1

| | | | Performance | | |
|---|---|---|---|---|---|
| Ex. No. | Nonionic Surfactant | HLB | Rigidity (cm) | Degree of Fluorescence Strength Increase | Cloth Touch |
| 2 | Polyoxyethylene lauryl ether (3.3) | 8.8 | 4.9 | 6.7 | Too Sticky |
| 3 | Polyoxyethylene lauryl ether (4.2) | 10.0 | 5.1 | 7.3 | Moderate |
| 4 | Polyoxyethylene lauryl ether (7.8) | 13.0 | 5.4 | 7.1 | " |
| 5 | Polyoxyethylene lauryl ether (11.4) | 14.6 | 5.8 | 6.8 | Too Stiff |
| 6 | Polyoxyethylene lauryl ether (72.6) | 18.9 | 6.0 | 6.3 | " |
| 7 | Polyoxyethylene nonylphenyl ether (9) | 12.4 | 5.2 | 7.2 | Moderate |
| 8 | Polyoxyethylene sorbitan tristearate (19) | 11.1 | 5.0 | 7.3 | " |

As shown in Table 1, the polyester test cloth which is treated with a diluted starch composition solution containing a nonionic surfactant having an HLB of 8.8 is too sticky and that which is treated with a starch composition solution containing a nonionic surfactant having an HLB of 14.6 or 18.9 is too stiff. Examples 3, 4, 7 and 8 are within the present invention. Examples 2, 5 and 6 are not.

EXAMPLES 9-11

By the same procedure of Example 1, liquid starch compositions having the following formulations are prepared:

| | |
|---|---|
| Polyoxyethylene (6.3) lauryl ether (HLB 12.1, Component A) | 0 or 1.8% by weight |
| Polyvinyl alcohol (saponification degree of about 80 mole percent, viscosity of 60 cps, Component B) | 0 or 13.4% by weight |
| Disodium 4,4'-bis(2-sulfostyryl)-biphenyl | 0.9% by weight |
| Water | Balance |

The starch compositions are diluted with 4 times by weight of water. Test pieces of polyester cloth are dipped in the diluted solution and air-dried. The performance of the starch compositions of Example 1 and Examples 9-11 are tested by the same manner as Example 2 using the treated polyester cloth pieces, except that adhesion conditions of the fluorescent optical brightener are observed instead of the cloth touch appraisal.

Results are shown in Table 2.

TABLE 2

| | Formulation | | Performance | | |
|---|---|---|---|---|---|
| Ex. No. | Component A (% by weight) | Component B (% by weight) | Rigidity (cm) | Degree of Fluorescence Strength Increase | Adhesion Condition of Fluorescent Optical Brightener |
| 1 | 1.8 | 13.4 | 5.0 | 6.8 | O |
| 9 | 0 | 13.4 | 5.9 | 7.2 | X |
| 10 | 0 | 0 | 3.8 | 0.2 | X |
| 11 | 1.8 | 0 | 3.4 | 5.7 | Δ |

As shown in Table 2, the degree of fluorescence strength increase is very small when a test clock is treated with a diluted starch composition containing only the fluorescent optical brightener disodium 4,4'-bis(2-sulfostyryl)biphenyl (Example 10). When a test cloth is treated with a diluted starch composition containing the fluorescent optical brightener and polyvinyl alcohol (Example 9), both rigidity and fluorescence strength increase, however, the fluorescent optical brightener adhesion is still uneven. When a test cloth is treated with a diluted starch composition containing the fluorescent optical brightener and polyoxyethylene lauryl ether (Example 11), the fluorescence strength increases, but the fluorescent optical brightener adhesion is nonuniform. When a test cloth is treated with a diluted starch composition containing all three components essential to the present invention (Example 1), good results are obtained with all items tested, i.e. rigidity, fluorescence strength and adhesion condition of the fluorescent optical brightener.

Example 1 is a preferred example of the product of the invention; Examples 9 to 11 are comparative examples of products not within the invention.

EXAMPLES 12-16

By the same procedure as Example 1, liquid starch compositions having the following formulations are prepared:

| | |
|---|---|
| Polyoxyethylene (6.3) lauryl ether (HLB 12.1) | 1.8% by weight |
| Polyvinyl alcohol (saponification degree of about 80 mole percent, viscosity of 60 cps) | 13.4% by weight |
| Fluorescent optical brightener (Shown in Table 3) | 0.2-7% by weight |
| Water | Balance |

The starch compositions are diluted with 4 times by weight of water. Test pieces of polyester cloth are dipped in the diluted solution and air-dried. The performances of the starch composition are tested by using the treated polyester cloth pieces except rigidity. Stability of the original starch compositions which are not diluted with water is also tested.

Results are shown in Table 3.

TABLE 3

| Example No. | Fluorescent Optical Brightener Kind | Amount (% by weight) | Degree of Fluorescence Strength Increase | Adhesion Condition of Fluorescent Optical Brightener | Stability of the Starch Composition |
|---|---|---|---|---|---|
| 12 | Disodium 4,4'-bis-(2-sulfostyryl) biphenyl | 0.2 | 2.8 | O | No change |
| 13 | | 0.3 | 4.5 | O | " |
| 14 | | 5 | 12.3 | O | Slightly gelled(transparent) |
| 15 | | 7 | 10.8 | O | Gelled & precipitated |
| 16 | Triazinylaminostilbene type *1 | 0.9 | 5.8 | X | Gelled & precipitated |

*1 Disodium 4,4'-bis (4-anilino-6-morpholino-1,3,5-2-yl) aminostilbene-2,2'-disulphonate, represented by the formula:

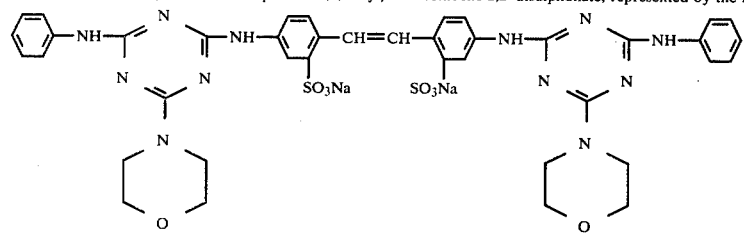

As shown in Table 3, amounts less than 0.3 percent by weight of disodium 4,4'-distyrylbiphenyl-2,2'-disulphonate result in insufficient fluorescent strength. More than 5 percent by weight of said fluorescent optical brightener in the composition or the use of a triazinylaminostilbene type fluorescent optical brightener result in gelation and precipitation. Examples 13 and 14 are within the present invention and Examples 12, 15 and 16 are not.

EXAMPLES 17–26

By the same procedure of Example 1, liquid starch compositions having the following formulations are prepared:

| | |
|---|---|
| Polyoxyethylene (6.3) lauryl ether (HLB 12.1, Component A) | 0–22% by weight |
| Polyvinyl alcohol (saponification degree of about 80 mole percent, viscosity of 60 cps, Component B) | 0–22% by weight |
| Disodium 4,4'-bis(2-sulfostyryl)-biphenyl | 0.9% by weight |
| Water | Balance |

The starch compositions are diluted with 4 times by weight of water. Test pieces of polyester cloth are dipped in the diluted solution and air-dried. The performance of the starch compositions is tested.

Results are shown in Table 4.

TABLE 4

| Example No. | Formulation Component A (% by weight) | Component B (% by weight) | Performance Rigidity (cm) | Cloth Touch |
|---|---|---|---|---|
| 17 | 15 | 0 | 3.2 | Too sticky |
| 18 | 14.25 | 0.75 | 3.4 | Slightly too sticky |
| 19 | 13.5 | 1.5 | 4.2 | Moderate |
| 20 | 7.5 | 7.5 | 4.5 | " |
| 21 | 1.5 | 13.5 | 5.0 | " |
| 22 | 0.75 | 14.25 | 6.0 | Too stiff |
| 23 | 0 | 15 | 6.1 | " |
| 24 | 1 | 1 | 3.7 | Less rigid |
| 25 | 5 | 22 | 5.2 | Slightly stiff |
| 26 | 22 | 5 | 3.3 | Slightly sticky |

As shown in Table 4, outside the weight ratio range of polyoxyethylene lauryl ether (Component A) to polyvinyl alcohol (Component B) from 9/1 to 1/9, a moderate cloth touch is not obtained. A total amount of Component A plus Component B of more than 25% by weight in the composition results in not only a worse cloth touch but also causes inconvenient handling and instability of the composition. Examples 9 to 21 are within the present invention and Examples 17, 18, and 22 to 26 are not.

EXAMPLES 27–28

By the same procedure as Example 1, liquid starch compositions having the following formulations are prepared:

| | |
|---|---|
| Polyoxyethylene (6.3) lauryl ether (HLB 12.1) | 2% by weight |
| Polyvinyl alcohol (saponification degree of 15% by mole) or Polyvinyl acetate | 10% by weight |
| Disodium 4,4'-bis(2-sulfostyryl)-biphenyl | 0.5% by weight |
| Methanol | 29% by weight |
| Water | 58.5% by weight |

The starch compositions are diluted with 4 times by weight of water. Test pieces of polyester cloth are dipped in the diluted solution and air-dried. Degrees of fluorescence strength increase are tested. An increasing degree of 2.8 is obtained when polyvinyl acetate is em= ployed (Example 27, not within the present invention) and an increasing degree of 6.9 is obtained when polyvinyl alcohol (saponification degree of 15% by mol) is employed (Example 28, within the present invention).

EXAMPLES 29-35

By the same procedure of Example 1, liquid starch compositions having the following formulations are prepared:

| | |
|---|---|
| Polyoxyethylene (6.3) lauryl ether (HLB 12.1) | 1.8% by weight |
| Nonionic water soluble polymer (shown in Table 5) | 13.4% by weight |
| Disodium 4,4'-bis(2-sulfostyryl)-biphenyl | 0.9% by weight |
| Water | Balance |

The starch compositions are diluted with 4 times by weight of water. Test pieces of polyester cloth are dipped in the diluted solution and air-dried. The performances of the starch compositions are tested using the treated polyester cloth pieces. Stability of the original starch compositions is also tested.

Results are shown in Table 5.

TABLE 5

| | | Performance | | | |
|---|---|---|---|---|---|
| Example No. | Nonionic Water Soluble Polymer | Rigidity (cm) | Fluorescence Strength Increasing Degree | Adhesion Condition of Fluorescent Optical Brightener | Stability of the Starch Composition |
| 29 | Copolymer of vinyl alcohol and maleic anhydride *1 | 4.9 | 6.7 | O | No change |
| 30 | Polyvinyl pyrrolidone *2 | 5.1 | 6.4 | O | " |
| 31 | Copolymer of vinyl pyrrolidone & methyl acrylate *3 | 4.8 | 6.5 | O | " |
| 32 | Copolymer of vinyl pyrrolidone and vinyl acetate *4 | 4.9 | 6.4 | O | " |
| 33 | Copolymer of vinyl pyrrolidone and maleic anhydride *5 | 5.2 | 6.6 | O | " |
| 34 | Polyethylene glycol *6 | 4.5 | 3.6 | X | " |
| 35 | Polyvinyl acetate *7 | 5.0 | 2.7 | X | Precipitated |

*1 Hydroxy radical content of 50% by mole, viscosity of 17 cps.
*2 Pyrrolidone radical content of 70% by mole, viscosity of 50 cps.
*3 Pyrrolidone radical content of 50% by mole, viscosity of 800 cps.
*4 Pyrrolidone radical content of 50% by mole, viscosity of 200 cps.
*5 Pyrrolidone radical content of 60% by mole, viscosity of 200 cps.
*6 Viscosity of 200 cps.
*7 Viscosity of 150 cps.
Examples 29-33 are within the present invention. Examples 34 and 35 are not.

What is claimed is:

1. A liquid composition consisting essentially of:
   [I] 3 to 25 percent by weight of a mixture of,
      (a) a nonionic surfactant of HLB 10 to 13 having one or more polyoxyethylene radicals in the molecule as a hydrophilic group,
      (b) polyvinyl alcohol,
      the weight ratio of said nonionic surfactant to said polyvinyl alcohol being 9/1 to 1/9,
   [II] 0.3 to 5 percent by weight of a 4, 4'-bis(2-sulfostyryl)-biphenyl salt represented by the formula,

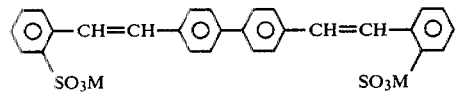

wherein M is sodium, potassium, monoethanol amine or diethanol amine, and
   [III] the balance being water to make the total 100 percent by weight, said composition being uniformly transparent.

2. A composition according to claim 1, wherein said nonionic surfactant is a polyoxyethylene alkyl ether represented by the formula,

$$R^1-O-(CH_2CH_2O)_mH$$

wherein $R^1$ is a linear or branched, primary or secondary alkyl radical having a carbon number of 8 to 22, and m is an integer of 3 to 8.

3. A composition according to claim 1, wherein said nonionic water soluble polymer has at least 15 mol percent of hydroxyl radicals in the molecule and a viscosity of 10 to 1000 cps in a 10 percent by weight aqueous solution at room temperature.

4. A composition according to claim 3, wherein said polyvinyl alcohol has a saponification degree of 50 to 100 mol percent.

5. A composition according to claim 1, wherein said 4,4'-bis(2-sulfostyryl)biphenyl salt is the disodium salt thereof.

6. A composition according to claim 5, wherein the amount of said disodium salt is 0.5 to 2 percent by weight in the composition.

7. A composition according to claim 1, wherein the total amount of said nonionic surfactant and said polyvinyl alcohol is 5 to 17 percent by weight.

8. A composition according to claim 7, wherein the weight ratio of said nonionic surfactant to said polyvinyl alcohol is ½ to ⅛.

9. A composition according to claim 1, wherein said composition consists essentially of:
(1) 1.5 to 2.0 percent by weight of polyoxyethylene alkyl ether having a linear primary alkyl radical of carbon number 10 to 18 and HLB of about 12,
(2) 10 to 15 percent by weight of polyvinyl alcohol having a saponification degree of about 80 mole percent and a viscosity of about 60 cps in 10 percent by weight aqueous solution at room temperature,
(3) 0.7 to 1.2 percent by weight of disodium 4,4'-bis(2-sulfostyryl)biphenyl, and
(4) the balance of water to make the total 100 percent by weight.

* * * * *